United States Patent
Warsakis

(10) Patent No.: US 6,910,494 B2
(45) Date of Patent: Jun. 28, 2005

(54) COMPOSITE COMPONENT, IN PARTICULAR VALVE, AND METHOD FOR THE PRODUCTION THEREOF

(75) Inventor: Thanassis Warsakis, Urbar (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/766,130

(22) Filed: Jan. 28, 2004

(65) Prior Publication Data

US 2004/0183047 A1 Sep. 23, 2004

Related U.S. Application Data

(63) Continuation of application No. PCT/EP02/08844, filed on Aug. 7, 2002.

(30) Foreign Application Priority Data

Aug. 10, 2001 (DE) .......................................... 101 39 499

(51) Int. Cl.$^7$ .............................................. F16K 51/00
(52) U.S. Cl. ............................. 137/15.18; 137/315.33; 137/540; 285/905; 251/337
(58) Field of Search .............................. 137/539, 539.5, 137/15.18, 15.19, 315.33, 540; 251/337; 285/381.1, 381.2, 381.3, 381.4, 381.5, 187, 905; 403/28, 29, 30

(56) References Cited

U.S. PATENT DOCUMENTS

| | | | |
|---|---|---|---|
| 4,856,970 A | 8/1989 | Oda et al. | |
| 4,893,650 A | 1/1990 | Chisholm et al. | |
| 5,609,182 A | 3/1997 | Beck et al. | |
| 6,116,273 A | 9/2000 | Tarr et al. | |
| 6,244,295 B1 * | 6/2001 | Bartussek et al. | 137/540 |
| 6,550,698 B2 * | 4/2003 | Ness | 239/571 |

FOREIGN PATENT DOCUMENTS

| | | |
|---|---|---|
| DE | 35 20 352 | 12/1986 |
| DE | 42 39 362 | 5/1994 |
| DE | 195 13 604 | 10/1996 |
| EP | 0 268 520 | 5/1988 |
| WO | 00/47363 | 8/2000 |

OTHER PUBLICATIONS

Celazole® PBI (CM), Polybenzimidazole, unfilled, compression molded. Datasheet [online]. Quadrant Engineering Plastic Products, copyright 1989–2004. [retrieved on Oct. 21, 2004]. Retrieved from the Internet: <URL:http://www.quadrantepp.matweb.com/SpecificMaterialNew.asp?bassnum=P1SM02&group=General>.

(Continued)

Primary Examiner—Edward K. Look
Assistant Examiner—John K. Fristoe, Jr.
(74) Attorney, Agent, or Firm—MacMillan, Sobanski & Todd, LLC

(57) ABSTRACT

The invention relates to a composite component, in particular a valve (10), and to a method for producing the composite component. The composite component comprises an inner component (14) configured as a cage, and an outer component (12) in the form of a valve body, which encloses the inner component (14) radially outwards, the inner component (14) being made at least radially outwards of a material with a first coefficient of thermal expansion and the outer component (12) being made at least radially inwards of a material with a second coefficient of thermal expansion, which is smaller than the first coefficient of thermal expansion, the outer component (12) having at least one internal-diameter enlargement (22) radially inwards, facing the inner component (14), and the inner component (14) being fastened to the outer component (12), on the one hand by means of a press fit (52) and, on the other hand, by means of a positive engagement (54) which is formed by a flow of the inner component (14) into the internal-diameter enlargement (22) of the outer component (12).

24 Claims, 3 Drawing Sheets

OTHER PUBLICATIONS

Properties of Common Solid Materials: Thermal Properties. Datasheet [online]. eFunda, copyright 2004. [retrieved on Oct. 21, 2004]. Retrieved from the Internet: <URL: http://www.efunda.com/materials/common_matl/Common_Matl.cfm?MatlPhase=Solid&MatlProp=Thermal#Thermal>.

Document Bibliography and Abstract for EP 0 268 520 from the European Patent Office website: http://v3.espacenet.com/textdoc?DB=EPODOC&IDX=EP0268520, printed Jan. 19, 2004.

Document Bibliography and Abstract for DE 35 20 352 from the European Patent Office website: http://v3.espacenet.com/textdoc?DB=EPODOC&IDX=DE3520352, printed Jan. 19, 2004.

Document Bibliography and Abstract for DE 42 39 362 from the European Patent Office website: http://v3.espacenet.com/textdoc?DB=EPODOC&IDX=DE4239362, printed Jan. 19, 2004.

Document Bibliography and Abstract for DE 195 13 604 from the European Patent Office website: http://v3.espacenet.com/textdoc?DB=EPODOC&IDX=DE19513604, printed Jan. 19, 2004.

\* cited by examiner

COMPOSITE COMPONENT, IN PARTICULAR VALVE, AND METHOD FOR THE PRODUCTION THEREOF

CROSS REFERENCE TO RELATED APPLICATIONS

This application is a continuation of International Application No. PCT/EP02/08844 filed Aug. 7, 2002, the disclosures of which are incorporated herein by reference, and which claimed priority to German Patent Application No. 101 39 499.3 filed Aug. 10, 2001, the disclosures of which are incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

SEQUENCE LIST

Not Applicable

BACKGROUND OF THE INVENTION

The invention relates to a composite component, in particular a valve, having an inner component and an outer component, which encloses the inner component radially outwards, the two components being connected to one another by means of a press fit. The invention furthermore relates to a method for producing the composite component.

In such a composite component, it is necessary to guarantee a reliable connection between the inner component and the outer component, often over a wide temperature range and even in the event of shaking or vibrations due to operation. In order to prevent accidental loosening of the two components, it is therefore generally necessary to press the inner component into the outer component with comparatively large forces in order to form the press fit. However, damage to one of the components, or even both components, frequently occurs owing to the large application forces when the press fit is being formed. Such damage is to some extent tolerated since smaller application forces would entail the risk of accidental loosening of the two components.

Instead of using a press fit, the inner component could also be fastened to the outer component by means of a different connection technique. For instance, it might be conceivable to provide snap-fit elements on the inner component, which are made to engage with corresponding recesses of the outer component in order to fasten the inner component to the outer component.

Such snap-fit connections, however, also suffer from disadvantages. For instance, engagement of the snap-fit elements may create contamination in the form of detached slivers which persistently impair the function of the composite component. In the case of valves, for example, the slivers may accumulate in the region between a valve seat and a valve element, and lead to sealing defects. For this reason, and for other reasons, it therefore often seems preferable to retain the connection concept of a press fit.

BRIEF SUMMARY OF THE INVENTION

It is an object of the invention to provide a composite component, in particular a valve, and a method for manufacturing the composite component, in which a press fit is formed between an inner component and an outer component, but in which the inherent disadvantages of the press fit do not arise or arise only to a lesser extent.

This object is achieved according to the invention by a composite component, in particular a valve, having an inner component and an outer component, which encloses the inner component radially outwards, the inner component being made at least radially outwards of a material with a first coefficient of thermal expansion and the outer component being made at least radially inwards of a material with a second coefficient of thermal expansion, which is smaller than the first coefficient of thermal expansion, and the outer component having at least one internal-diameter enlargement radially inwards, facing the inner component, and the inner component being connected to the outer component, on the one hand by means of a press fit and, on the other hand, by means of a positive engagement which is formed by a thermally induced flow of the inner component into the internal-diameter enlargement of the outer component.

The combination according to the invention of a press fit and positive engagement has the advantage that the application forces required for forming the press fit can be reduced significantly, and the composite component nevertheless has outstanding stability owing to the additional positive-engagement connection between the inner component and the outer component.

In order to prevent accidental loosening of the positive-engagement connection between the inner component and the outer component, i.e. for example extraction of the inner component from the outer component, the at least one internal-diameter enlargement is expediently enclosed at least partially by regions with a smaller internal diameter. For instance, the outer component may have an internal diameter increasing locally in the insertion direction radially inwards. This is the case, for example, whenever the at least one internal-diameter enlargement is a locally formed or fully circumferential groove extending in the direction of the inner circumference of the outer component. Instead of groove-like internal-diameter enlargements, or in addition to groove-like internal-diameter enlargements, differently shaped internal-diameter enlargements may also be employed. For instance, it is conceivable to provide internal-diameter enlargements in the form of bores which pass through a wall of the outer component. The individual internal-diameter enlargements may be arranged offset relative to one another with respect to a longitudinal axis of the outer component, i.e. in the axial direction.

The inner component and/or the outer component may have a discontinuous contour in the circumferential direction, for example slotted or provided with cavities. For reasons of stability, however, a completely or at least substantially continuous contour is preferred. The inner component and/or the outer component may be formed substantially cylindrically or in the shape of a ring. It is, however, also possible to provide components which are conical, shaped as pots, etc. The inner component and/or the outer component preferably have an annular cross section. Other components, however, are also conceivable. For instance, it is possible to provide inner components and/or outer components with a cross section which is substantially triangular, quadrilateral, oval, etc.

The inner component may be arranged coaxially or off-centred with respect to the outer component. A particularly stable connection of the inner component and the outer component is guaranteed in the case of a coaxial arrangement.

As mentioned above, the outer component has a lower coefficient of thermal expansion a than the inner component. The coefficient of thermal expansion a of a solid substance is defined by the relation The coefficient of thermal expansion a is hence the factor of proportionality between the relative extension $\Delta l/l$ induced by a temperature difference and the temperature difference $\Delta T$.

The coefficient of thermal expansion $a_a$ of the outer component is preferably less than about $12 \cdot 10^{-6} \cdot K^{-1}$ and is, in particular, of the order of magnitude of about $10 \cdot 10^{-6} \cdot K^{-1}$. The coefficient of thermal expansion $a_I$ of the inner component is preferably greater than about $13 \cdot 10^{-6} \cdot K^{-1}$ and is, in particular, of the order of magnitude of about $14 \cdot 10^{-6} \cdot K^{-1}$. According to a preferred embodiment, the outer component is made of metal at least radially inwards and the inner component is made of plastic at least radially outwards.

Although the composite component according to the invention can be used in a wide variety of technical fields, the composite component is preferably part of a valve. In this case, for example, the outer component may be a valve body which has a valve seat on the inside and/or on the outside. The valve may furthermore comprise a valve element which cooperates with this valve seat. It is conceivable to bias the valve element against the valve seat by means of an elastic element. If the valve seat is formed in the interior of the valve body, the inner component may be configured as a cage, the elastic element being supported, on the one hand, on the cage and, on the other hand, on the valve element.

In order to manufacture the composite component according to the invention, the two components are connected to one another in a first step by pressing the inner component into the outer component. The press fit is hence formed first. The formation of the positive-engagement connection is carried out in a second step. This is done by heating the two components which have been connected by means of the press fit, so that the inner component flows at least locally into the internal-diameter enlargement of the outer component. This flow is synergistically assisted by the press fit which has already been formed, so that the composite component does not need to be heated excessively.

The heating of the connected components in order to form the positive engagement preferably takes place in the scope of running-in the composite component, that is to say when the composite component is brought to operating temperature for the first time. If the composite component is a valve, the heating of the valve which is required in order to form the positive engagement may be induced by a heated fluid medium, to which the valve is exposed. The operating temperature of the composite component is expediently more than 70° C., and preferably more than 80° C. Instead of not forming the positive engagement until the composite component is being run-in, it is also conceivable to provide a separate heating step before actually running it in.

The application force should be selected to be low enough, according to the materials of the inner component and of the component, so that the press fit is formed without causing damage. On the other hand, the application force should be selected to be large enough so that a reliable press fit is guaranteed in a lower temperature range, which is preferably below 80° C. and, in particular, below 70° C. For the aforementioned case in which the connection between the inner component and the outer component is additionally subjected to a biased elastic element, the application force needs to be increased accordingly. According to a preferred embodiment, the characteristics of the press fit and of the positive engagement are selected in such a way that a reliable connection between the inner component and the outer component is guaranteed in a temperature range of from −40° C. to 125° C.

Various objects and advantages of this invention will become apparent to those skilled in the art from the following detailed description of the preferred embodiment, when read in light of the accompanying drawings.

DETAILED DESCRIPTION OF THE INVENTION

Figure 1:
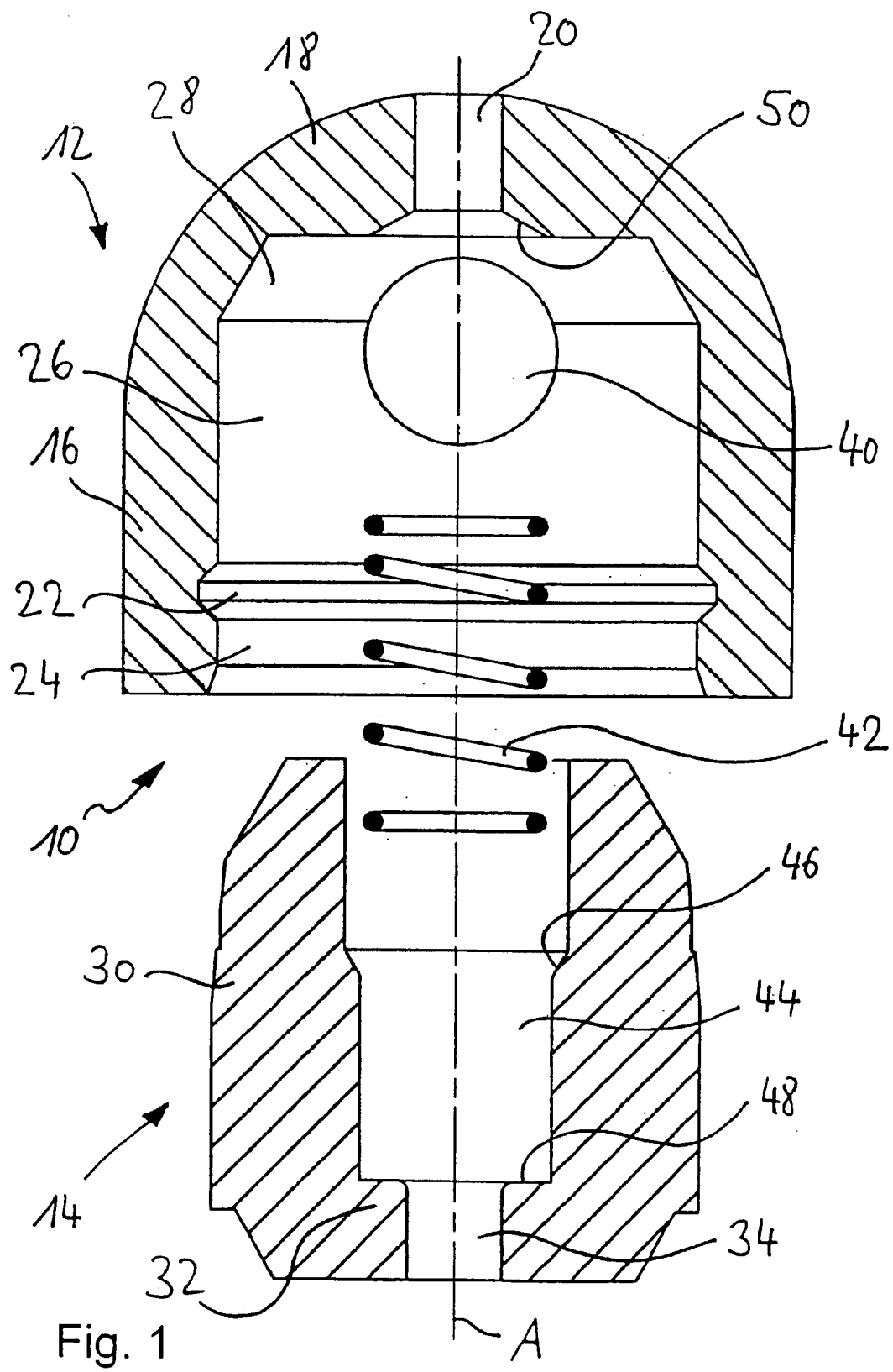
FIG. 1 shows an exemplary embodiment of a valve according to the invention before assembly.

FIG. 1 represents an exemplary embodiment of a composite component according to the invention, in the form of a valve 10, in the unassembled state. The valve 10 comprises a valve body 12 as the outer component and a spring cage 14 as the inner component.

The valve body 12, which is made of steel ($a_a=10 \cdot 10^{-6} \cdot K^{-1}$), has a hollow cylindrical section 16 which merges into a cap-shaped section 18 in the direction in which the spring cage 14 is inserted into the valve body 12. A cylindrical access opening 20 is formed along a longitudinal axis A of the valve 10 in the cap-shaped section 18.

Radially inwards in the region of the cylindrical section 16, the valve body 12 has a continuous internal-diameter enlargement extending in the circumferential direction in the form of a trapezoidal groove 22. The groove 22 is arranged between two sections 24, 26 of the valve body 12 with a reduced internal diameter compared with the groove 22. The section 26 which faces the access opening 20 opens into a conical section 28 with an internal diameter that decreases in the insertion direction.

The spring cage 14, which is made of plastic ($a_I=14 \cdot 10^{-6} \cdot K^{-1}$), is arranged coaxially with the valve body 12. The spring cage 14 has a substantially cylindrical section 30, which is closed by an inner flange 32 on its side that faces away from the valve body 12. The inner flange 32 does not seal the spring cage 30 completely on its side that faces away from the valve body 12, however, but instead leaves open an access opening 34 extending along the longitudinal axis A.

The valve 10 represented in FIG. 1 furthermore comprises a valve element configured as a ball 40, as well as an elastic element in the form of a coil spring 42. When the valve 10 is in the assembled state, the ball 40 and the coil spring 42 are both arranged in a central accommodation opening 44 of the spring cage 14. The accommodation opening 44 has an internal diameter which decreases stepwise counter to the insertion direction, with a step 46 configured as a conical section restricting the axial movement of the ball 40 counter to the insertion direction.

When the valve 10 is in the assembled state, the coil spring 42 is supported, on the one hand, on an end face 48 of the inner flange 32 facing towards the valve body 12 and, on the other hand, on the ball 40. The ball 40 is in this case elastically biased in the actuation direction by the coil spring 42 against a valve seat 50, which is formed on the inside of the cap-shaped section 18 of the valve body 12 and opens into the access opening 20.

Figure 2:
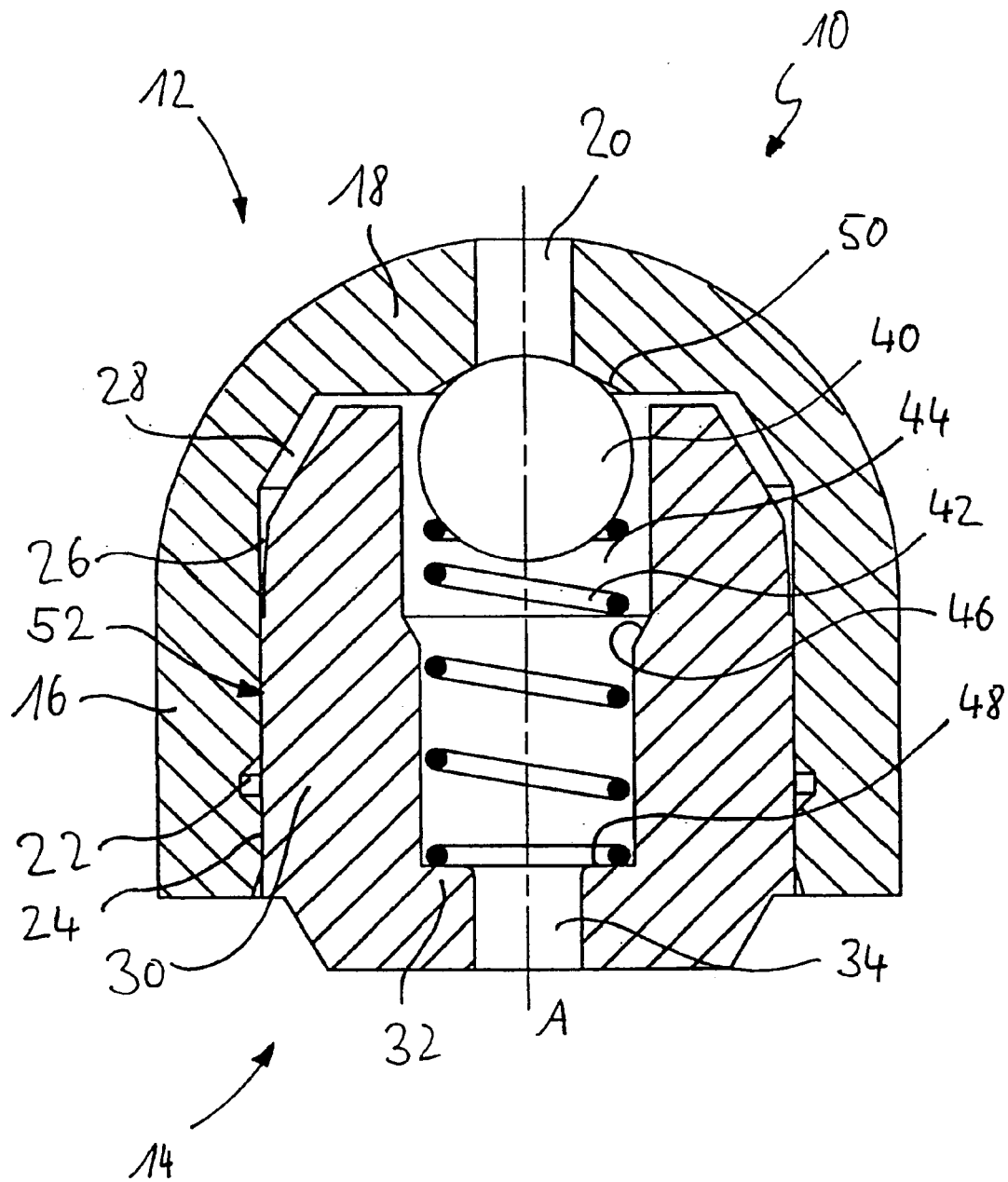
FIG. 2 shows the valve according to FIG. 1 in the partially assembled state after the formation of a press fit.

The valve 10 is shown in the partially assembled state in FIG. 2. In the partially assembled state, the spring cage 14 is pressed into the valve body 12. The application force necessary for this depends on the shape of the outer circumference of the spring cage 14 and on the shape of the internal diameter of the valve body 12. In the present case, the valve body 12 and the spring cage 14 have been configured so that the application force required in order to form a press fit 52 always guarantees a reliable connection of the spring cage 14 and the valve body 12 at temperatures below 80° C. In this case, it should be borne in mind that the application force must in any event be selected to be greater than the restoring force of the compressed coil spring 42.

Following the formation of the press fit 52, a positive-engagement connection needs to be produced between the spring cage 14 and the valve body 12. The formation of the positive engagement is not, however, carried out directly during the production of the valve 10, but instead only when it is first being run-in, i.e. only in the installed state. The valve 10 is hence delivered and installed in the assembly state represented in FIG. 2.

During first running-in of the valve 10, a fluid medium at a temperature of 80° C. is applied to the valve 10, or flows through it. The valve 10 is then likewise heated to an operating temperature of 80° C. This heating of the valve 10 leads to expansion both of the valve body 12 and of the spring cage 14. Since, however, the coefficient of thermal expansion $a_i$ of the spring cage 14 is greater than that of the valve body 12, the spring cage 14 expands more than the valve body 12. Owing to this differential expansion, the plastic material of the spring cage 14 flows locally into the groove 22 of the valve body 12. A positive-engagement 54 is therefore formed between the spring cage 14 and the valve body 12.

Figure 3:
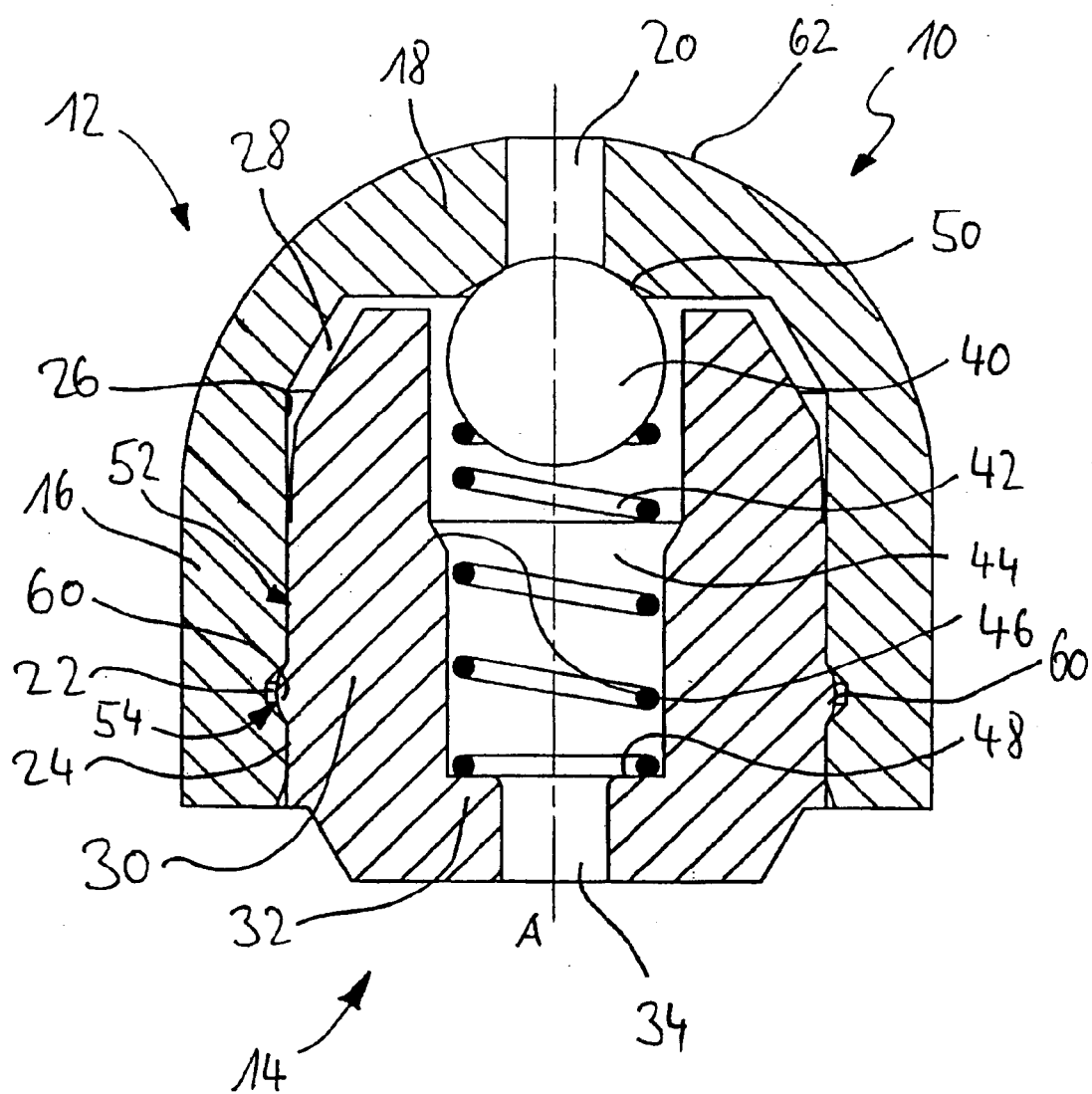
FIG. 3 shows the valve according to FIG. 2 after heating and the formation of a positive engagement.

This situation is represented in FIG. 3. Clearly shown are the curvatures 60 in the region of the outer circumference of the spring cage 14, which are attributable to the different coefficients of thermal expansion or the flow of the material of the spring cage 14. The curvatures 60 engage positively into the groove 22 of the valve body 12, and are preserved even after the valve 10 has been cooled to ambient temperature. The composite component according to the invention is thus produced following the first running-in of the valve 10.

The valve 10 represented in FIG. 3 is a non-return valve. The valve 10 may be opened, i.e. the ball 40 lifted from the valve seat 50, either by a positive pressure or by means of a piston rod which protrudes through the access opening 20 and cooperates with the ball 40. The outer surface 62 of the cap-shaped region 18 of the valve body 12 may function as a further valve seat. The valve 10 can therefore be employed in complex fluidic-control systems, for example in the field of vehicle brake systems.

Although the invention has been described by way of example with reference to a valve 10, the composite components produced by means of the manufacturing method according to the invention may also be used in the field of general mechanical engineering and in other fields.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A composite component comprising:
    an inner component being made at least radially outwards of a material with a first coefficient of thermal expansion; and
    an outer component, which encloses the inner component radially outwards, the outer component being made at least radially inwards of a material with a second coefficient of thermal expansion, which is smaller than the first coefficient of thermal expansion, the outer component having at least one internal-diameter enlargement radially inwards, facing the inner component, and the inner component being fastened to the outer component, on the one hand by means of a press fit and, on the other hand, by means of a positive engagement which is formed by a thermally induced flow of the inner component into the internal-diameter enlargement of the outer component.

2. The composite component according to claim 1, wherein the outer component is a valve body.

3. The composite component according to claim 2, wherein the valve body has at least one of an inner valve seat and an outer valve seat.

4. The composite component according to claim 3, wherein the valve comprises a valve element which cooperates with the inner valve seat.

5. The composite component according to claim 4, wherein the valve comprises an elastic element which biases the valve element against the inner valve seat.

6. The composite component according to claim 5, wherein the inner component is a cage and the elastic element is supported, on the one hand, on the cage and, on the other hand, on the valve element.

7. The composite component according to claim 1, wherein at least one of the internal-diameter engagement is enclosed at least partially by regions with a smaller internal diameter, in order to prevent accidental loosening of the positive-engagement connection between the inner component and the outer component.

8. The composite component according to claim 1, wherein the at least one internal-diameter enlargement is a locally formed or fully circumferential groove extending in the direction of the inner circumference of the outer component.

9. The composite component according to claim 1, wherein at least one of the inner component and the outer component has a continuous contour in the circumferential direction.

10. The composite component according to claim 1, wherein at least one of the inner component and the outer component are formed substantially cylindrically or in the shape of a ring.

11. The composite component according to claim 1, wherein at least one of the inner component and the outer component has a substantially annular cross section.

12. The composite component according to claim 1, wherein the inner component is arranged coaxially with respect to the outer component.

13. The composite component according to claim 1, wherein the inner component is made of plastic at least radially outwards.

14. The composite component according to claim 1, wherein the outer component is made of metal at least radially inwards.

15. A method for manufacturing a composite component by fastening an inner component to an outer component which encloses the inner component radially outwards, the inner component being made at least radially outwards of a material with a first coefficient of thermal expansion and the outer component being made at least radially inwards of a material with a second coefficient of thermal expansion, which is smaller than the first coefficient of thermal expansion, the outer component having at least one internal-diameter enlargement radially inwards, facing the inner component, the method comprising:
    connecting the two components by pressing the inner component into the outer component, in order to form a press fit; and
    forming a positive engagement by heating the connected components, such that the inner component flows at least locally into the internal-diameter enlargement of the outer component.

16. The method according to claim 15, wherein the heating of the two connected components in order to form the positive engagement takes place when running-in the composite component.

17. The method according to claim 16, wherein during the running-in temperatures of the composite component in excess of 70° C. are reached.

18. The method according to claim 15, wherein the heating of the two connected components in order to form the positive engagement takes place in a separate heating step before running-in the composite component.

19. The method according to claim 15, wherein an application force for pressing the inner component into the outer component is selected to be low enough so that the press fit is formed without causing damage.

20. The method according to claim 15, wherein an application force for pressing the inner component into the outer component is selected to be large enough so that a reliable press fit is guaranteed in a temperature range of below 80° C.

21. The method according to claim 15, wherein the material of the inner component is selected so that the inner component starts to fill the internal-diameter enlargement of the outer component at 70° C.

22. The method according to claim 15, wherein the press fit end the positive engagement are formed such that a reliable connection between the inner component and the outer component is guaranteed in a temperature range of from −40° C. to 125° C.

23. A valve comprising:

an inner component that is made at least partially of a first material with a first coefficient of thermal expansion; and an outer component, which encloses the inner component radially at the outside and which is made at least partially of a second material with a second coefficient of thermal expansion, the second coefficient of thermal expansion being smaller than the first coefficient of thermal expansion, the outer component having at least one portion of a widened inner diameter which faces the inner component;

wherein the inner component is fastened to the outer component by means of a press fit and by means of a positive engagement formed by a thermally induced flow of the first material into the portion of widened inner diameter of the outer component.

24. A composite component comprising:

an inner component comprising a first material with a first coefficient of thermal expansion; and an outer component, which radially encompasses the inner component, the outer component being made at least partially of a second material with a second coefficient of thermal expansion, the second coefficient of thermal expansion being smaller than the first coefficient of thermal expansion, at least one region of the outer component having a relatively large internal diameter facing the inner component and at least another region of the outer component having a relatively small internal diameter facing the inner component, the inner component being fastened to the outer component by a press fit within the relatively small internal diameter region, the inner component being thereby fixed in a position relative to the outer component such that a portion of the first material will be urged to expand and deform outwardly toward the region of the outer component having the relatively large internal diameter upon heating of the inner and outer components.

* * * * *

UNITED STATES PATENT AND TRADEMARK OFFICE
CERTIFICATE OF CORRECTION

PATENT NO. : 6,910,494 B2
DATED : June 28, 2005
INVENTOR(S) : Thanassis Warsakis It is certified that error appears in the above-identified patent and that said Letters Patent is hereby corrected as shown below:

Column 7,
Line 18, delete "end" and insert -- and --.

Signed and Sealed this

Thirtieth Day of August, 2005

JON W. DUDAS
*Director of the United States Patent and Trademark Office*